United States Patent [19]
Branan, Jr.

[11] Patent Number: 5,594,579
[45] Date of Patent: Jan. 14, 1997

[54] RADIO PERMITTING INFORMATION TRANSFER BETWEEN RADIO FREQUENCY SHIELDED SUB-SYSTEMS

[75] Inventor: M. William Branan, Jr., Ft. Lauderdale, Fla.

[73] Assignee: Motorola, Inc., Schaumburg, Ill.

[21] Appl. No.: 233,566

[22] Filed: Apr. 26, 1994

Related U.S. Application Data

[63] Continuation-in-part of Ser. No. 813,466, Dec. 26, 1991.

[51] Int. Cl.$^6$ .................................................. H04B 10/00
[52] U.S. Cl. .......................... 359/145; 359/146; 359/152; 459/83
[58] Field of Search ............................ 250/551; 359/145, 359/152, 153, 159; 455/66, 83, 143, 146

[56] References Cited

U.S. PATENT DOCUMENTS

| | | | |
|---|---|---|---|
| 4,499,608 | 2/1985 | Broockman | 359/163 |
| 4,570,079 | 2/1986 | Davis | 250/551 |
| 4,612,670 | 9/1986 | Henderson | 359/163 |
| 4,625,333 | 11/1986 | Takezawa | 359/188 |
| 4,719,358 | 1/1988 | Matsumoto | 250/551 |
| 4,887,313 | 12/1989 | Luke et al. | 455/612 |
| 4,904,993 | 2/1990 | Sato | 340/825.57 |
| 4,964,693 | 10/1990 | Branan, Jr. et al. | 350/96.29 |
| 5,299,046 | 3/1994 | Spaeth | 359/163 |

FOREIGN PATENT DOCUMENTS

| | | | |
|---|---|---|---|
| 0155053 | 9/1985 | European Pat. Off. | 359/145 |
| 0143854 | 11/1980 | Japan | 359/145 |
| 0172023 | 10/1983 | Japan | 359/189 |
| 59-205834 | 10/1983 | Japan | 359/145 |
| 0009240 | 1/1990 | Japan | 359/145 |
| 9011539 | 10/1990 | WIPO | 359/145 |

*Primary Examiner*—Leo Boudreau
*Assistant Examiner*—Rafael Bacares
*Attorney, Agent, or Firm*—Dale W. Dorinski

[57] ABSTRACT

A radio (300) includes shielded circuitry (318) residing within radio frequency electromagnetic shielding structure (320) that has an aperture (322) formed therein. The shielded circuitry includes an optical transmitter (206) to direct light (information) through the aperture to an optical detector (208) coupled to other circuitry residing outside of the electromagnetic shielding structure. In this way, the optical detector receives light (information) from the optical transmitter via the aperture without degrading the radio frequency shielding of the shielded circuitry.

2 Claims, 2 Drawing Sheets

5,594,579

RADIO PERMITTING INFORMATION TRANSFER BETWEEN RADIO FREQUENCY SHIELDED SUB-SYSTEMS

CROSS REFERENCE TO RELATED APPLICATIONS

This application is a continuation-in-part of prior U.S. application Ser. No. 07/813,466, filed Dec. 26, 1991, by M. William Branan, Jr., and assigned to Motorola, Inc.

TECHNICAL FIELD

This invention relates generally to radios having electromagnetically shielded circuitry that must conduct signals or information to other circuitry.

BACKGROUND

It is common in the radio arts to electromagnetically shield or protect certain circuitry by enclosing the protected circuitry in a conductive structure or housing that is coupled to a ground potential. The goal of conventional electromagnetic shielding practice is to prevent or sufficiently reduce radiated electromagnetic interference (EMI) such that the device performs properly or conforms to specifications such as those required by the Federal Communications Commission (FCC). EMI is caused by unrestricted electrical and magnetic energy that escapes from any electrical device and reaches a second unintended device. It is called EMI if the receiving device malfunctions as a result of this "pollution". For most practical purposes, the majority of EMI problems are limited to a part of the electromagnetic spectrum from 1 kHZ to 10 GHZ. This portion of the electromagnetic spectrum is known as the radio frequency interference (RFI) band and covers the radio and audio frequencies.

Techniques which offer protection against RFI are varied, but generally seek to block the sensitive circuitry from the RFI signal. Placing a Faraday Cage around an electrical device is the fundamental principle underlying the housing techniques for shielding against RFI. Most often the housing approach to shielding is applied to the external housing of the entire device. However, the approach can be applied as an internal shielding mechanism. In this case, a mini box that is electrically conductive is used to isolate the susceptible components. The result is the creation of a mini Faraday Cage inside the finished device.

Problems occur, however, when information or signals must be transferred between the protected circuitry and other circuitry within the device. To do this, apertures are typically required to be formed in the shielding structure to permit a connector or the like to pass through the aperture to conduct signals or information into and/or out of the shielding structure. Depending on the size of the connectors, and hence the apertures, the effectiveness of the shielding structure may be compromised. Moreover, even if the radiated interference is not increased by the presence of the aperture in the shielding structure, interference within the shielding structure may be radiated into the wires or conductors coupled to the connector, and thus conduct interference outside the shielding structure to contaminate other circuitry. Accordingly, there is a need in the art for a technique to electromagnetically shield electronic circuitry while permitting information to be readily passed between the shielded circuitry and other circuitry.

SUMMARY OF THE INVENTION

Briefly, according to the invention, a radio includes shielded circuitry residing within a electromagnetic shielding structure that has an aperture formed therein. The shielded circuitry includes an optical transmitter to direct light (information) through the aperture to an optical detector coupled to other circuitry residing outside of the electromagnetic shielding structure. In this way, the optical detector receives light (information) from the optical transmitter via the aperture without degrading the radio frequency shielding of the shielded circuitry.

DETAILED DESCRIPTION OF THE PREFERRED EMBODIMENT

Figure 1:
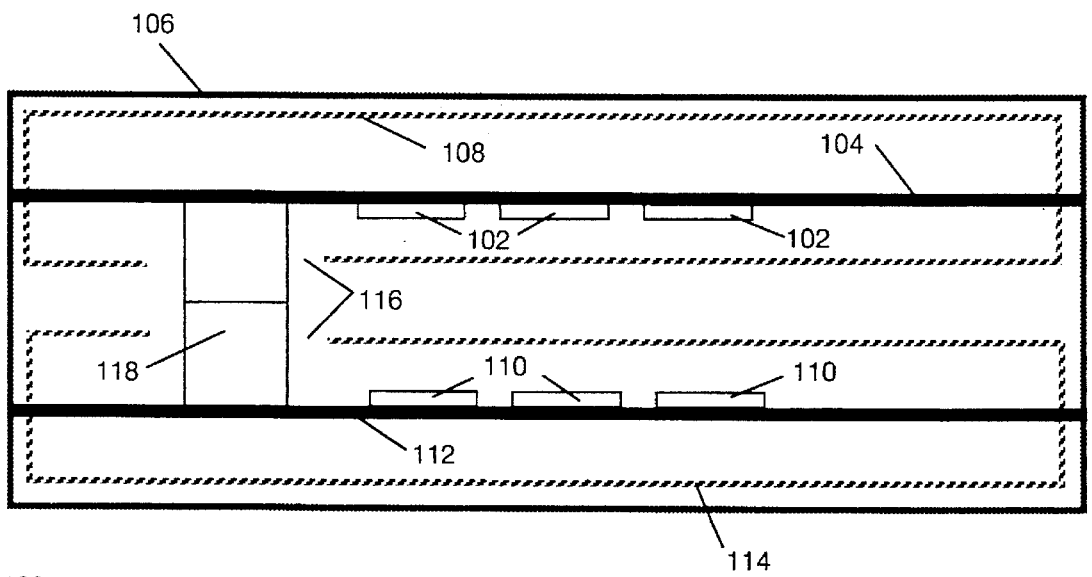
FIG. 1 is an illustration of conventional radio frequency shielding practices.

FIG. 1 illustrates a partial cross sectional side view of an assembly 100 employing conventional radio frequency shielding practices. The assembly includes first circuitry (consisting generally of a selection of resistors, capacitors, inductors, transistors or integrated circuits) 102 that reside on a printed circuit board 104. The printed circuit board 104 is mounted to a RFI shielded chassis 106 via conventional techniques. A conductive member enclosure or plate 108 is also coupled to the shielded chassis in a manner to enclose the printed circuit board 104 with a RFI shielded structure or housing formed by the shielded chassis 106 and the conductive member 108.

FIG. 1 also illustrates second or other circuitry (that also consisting generally of a selection of resistors, capacitors, inductors, transistors or integrated circuits) 110 residing on another printed circuit board 112. This printed circuit board 112 and another conductive member or plate 114 are coupled in a manner to enclose the printed circuit board 112 within another RFI shielded structure or housing formed by the shielded chassis 106 and the conductive member 114. Optionally, the second circuitry need not reside in a shielded structure.

In an ideal world, radio frequency interference would be prevented from entering into or escaping the shielded areas. However, if, as is typically the case, signals or information must be communicated from the first circuitry 102 to the second circuitry 110 (or vise versa), an aperture 116 must be formed at some point in the shielded housing to permit a connector (or a connector pair) 118 to couple wires or cables between the first and second circuitry. Due to the presence of this aperture, a discontinuity in the shield is created, which results in a degradation or failure of the shielding structure to effectively prevent or sufficiently reduce the ingress or egress of radio frequency interference. This is particularly troublesome if, for example, one or more multiconductor busses (such as address and data busses) commonly used by microprocessors, microcontrollers, or digital signal processors (DSP's) must be coupled between the first and second circuitry.

Figure 2:
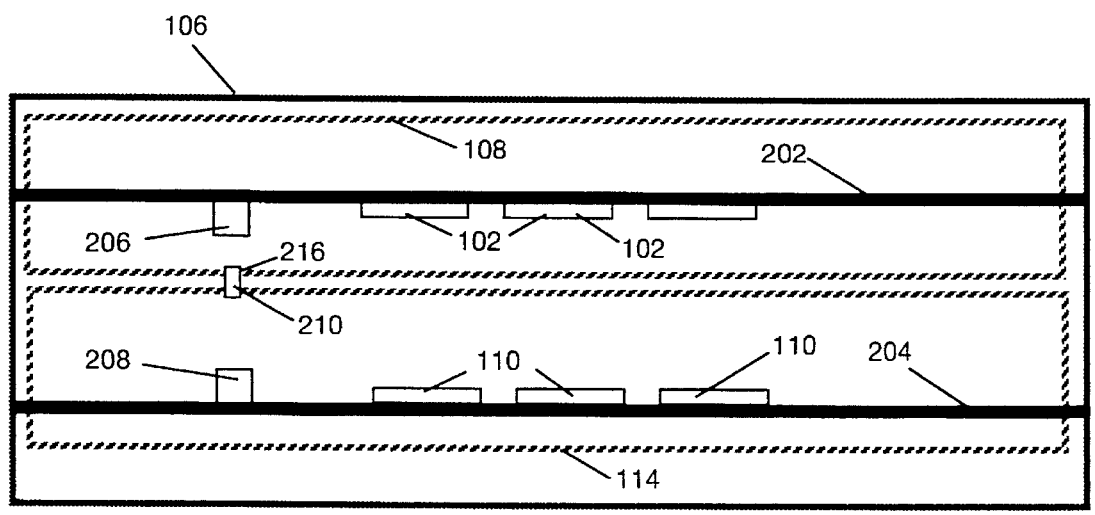
FIG. 2 is an illustration of radio frequency shielding in accordance with the present invention.

FIG. 2 illustrates a partial cross sectional side view of an assembly 200 employing radio frequency shielding techniques in accordance with the present invention. The assembly 200 also includes first circuitry (consisting generally of a selection of resistors, capacitors, inductors, transistors or integrated circuits) 102 that reside on a circuit carrying substrate 202, which comprises a printed circuit board in the preferred embodiment. Optionally, molded circuit structures or ceramic circuit substrates may be used. The circuit carrying substrate 202 is mounted to a RFI shielded chassis 106 via conventional techniques. A conductive member or plate 108 is also coupled to the shielded chassis in a manner to enclose the circuit carrying substrate 202 with a RFI shielded structure or housing formed by the RFI shielded chassis 106 and the conductive member 108.

FIG. 2 also illustrates second or other circuitry (that also consisting generally of a selection of resistors, capacitors, inductors, transistors or integrated circuits) 110 residing on another circuit carrying substrate 204, which also comprises a printed circuit board in the preferred embodiment. Optionally, molded circuit structures or ceramic circuit substrates may be used. The circuit carrying substrate 204 and another conductive member or plate 114 are also coupled to the RFI shielded chassis 106 in a manner to enclose the printed circuit board 204 within a shielded structure or housing formed by the RFI shielded chassis 108 and the conductive member 108. Optionally, the second circuitry need not reside in a shielded structure.

Those skilled in the art will appreciate that the radio frequency shielding structure need not be a solid, unbroken wall, but can instead have small apertures formed therein provided that the size of the apertures does not permit electromagnetic interference in the frequency range or concern to enter or escape the shielded structure. In fact, the apertures can have a beneficial side effect in that they facilitate the cooling of the circuitry within the shielded structure or housing. The actual size of the apertures will therefore vary depending upon the frequencies that are desired to be contained or excluded, but can be determined by those skilled in the art using known methods. In general, the longest dimension of the apertures should be less than 1/100th of the wavelength of interference to be contained or excluded.

According to the invention, the first circuitry 102 has included therewith an optical transmitter 206 which is constructed and arranged to be positioned in alignment with an aperture 210 in the RFI shielded housing. In this way, light modulated by signals or information generated by the optical transmitter 206 and directed toward and through the aperture. Of course, the preferred aperture 216 is one having a size and shape that does not substantially degrade the effectiveness of the shielded structure or housing. For critical applications or implementations required to meet stringent specifications (for example, military specifications), it is possible to use metallized glass, plastic, or similar material that is, in effect, optically transparent (or at least translucent) yet electrically conductive such that the shielded structure functions as unbroken or uninterrupted in an electrical sense.

On the other side of the aperture, the second or other circuitry 110 has included therewith an optical receiver 208, which is constructed and arranged to receive optically transmitted information from the optical transmitter 206 via the aperture. In this way, information can be communicated from shielded circuitry to other circuitry without degrading the shielding effectiveness of the radio frequency shielded structure. Optionally, a light guide 210, which may comprise a lens, can be positioned within the aperture to guide or focus light from the optical transmitter 206 to the optical receiver 208. Moreover, the radio frequency shielded circuitry and the other circuitry can also include an optical receiver and optical transmitter, respectively, so that bi-directional communication may be achieved. Since the preferred aperture(s) do not substantially degrade the effectiveness of the radio frequency shielding structure (and may, in fact, benefit the shielded circuitry by facilitating cooling of the shielded circuitry), several pairs of optical transmitters and receiver may be used to provide electromagnetic interference free data or signal busses for microprocessors, microcontrollers or DSP's. Alternately, if serial communication is acceptable in a particular implementation, an optical transmitter/receiver pair for each direction of communication desired is all that is required.

Figure 3:
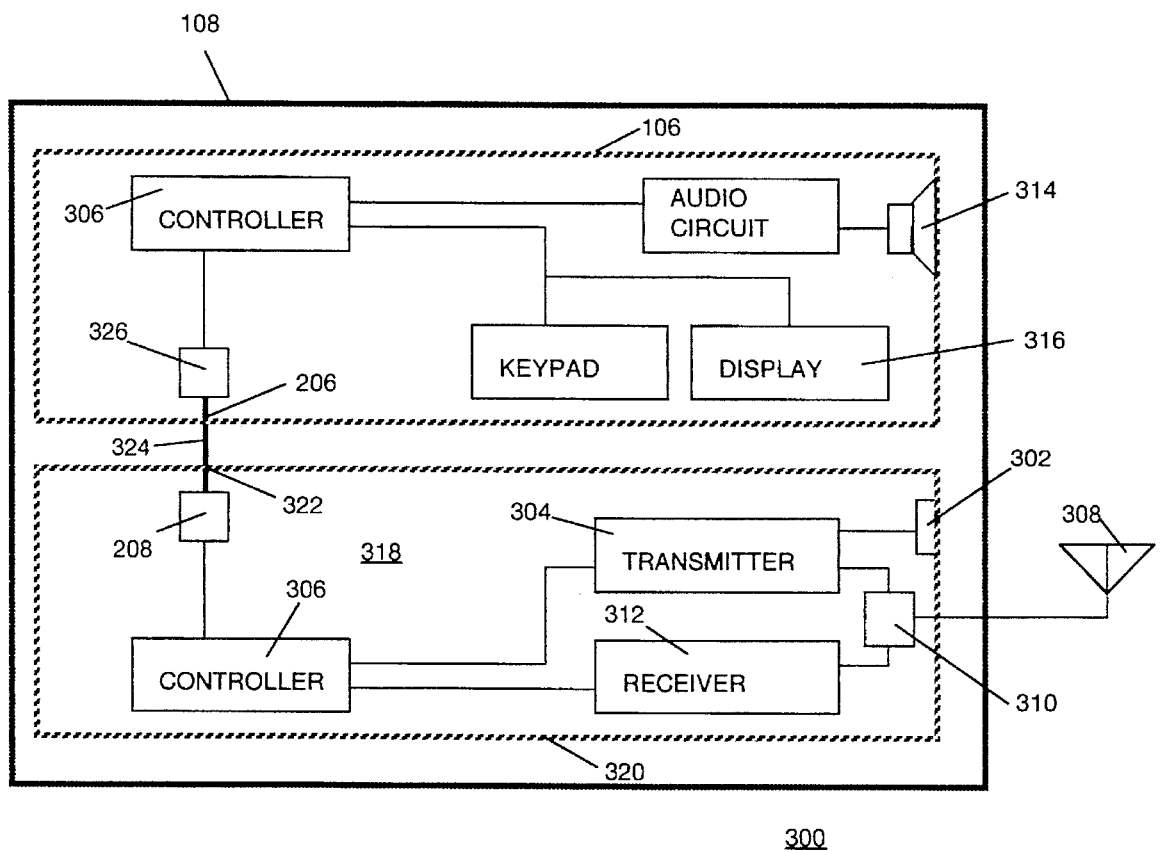
FIG. 3 is a schematic diagram of a radio employing the radio frequency shielding technique of the present invention.

Referring to FIG. 3, a schematic diagram of a radio 300 having circuitry shielded in accordance with the present invention is shown. To transmit information, a user speaks into a microphone 302 that is coupled to a transmitter circuitry 304. The transmitter circuitry 304 is controlled by a controller 306 to select transmit frequency, signaling, coding format, and other parameters as may be desired in any particular implementation. The transmitter 304 is coupled to an antenna 308 via an antenna switch 310 that is also controlled by the controller 306 so that information may be transmitted via a radio frequency signal.

To receive information, the controller causes the antenna switch 310 to couple the antenna 308 to a receiver 312. The receiver 312 is also controlled by the controller 306 to select receive frequency, decoding format, output volume, and other parameters as may be desired in any particular implementation. Optionally, the radio 300 can provide an audible (BEEP), visual (flashing light) or a tactile (vibratory) signal to indicate receipt of a message or other information as is known in the art. Received audio information is preferably presented to the user via a speaker 314, while data is preferably presented to the user via a display 316.

According to the invention, the radio 300 also includes first circuitry 318 that resides within a RFI shielded structure or housing 320. The first circuitry preferably consist of a selection of resistors, capacitors, inductors, transistors or integrated circuits (not shown), and need not be any particular circuitry (i.e., transmit or receive circuitry), but rather can be any circuitry that is shielded in implementation. That is, the first circuitry 318 can be a portion of the transmitter 304, the receiver 312, the other circuitry and is illustrated separately in FIG. 3 for clarity of understanding the present invention.

The RFI shielded housing 320 has at least one aperture 322 formed therein, which, as discussed above, preferably does not substantially degrade the radio frequency shielding performance of the shielded structure 320. Optionally, a light guide or lens 324 can be positioned in the aperture to guide or focus the light provided by an optical transmitter within the shielded structure to be received by an optical receiver 326, which is illustrated in FIG. 3 as being coupled to the controller 306. In this way, information can be communicated to the controller through the shielded housing without degrading the effectiveness of the shielding of the first circuitry.

What is claimed is:

1. A radio, comprising:

means for receiving radio frequency information;

means for transmitting information via a radio frequency signal;

an antenna;

antenna switching means for selectively coupling the antenna to the receiving means and the transmitting means;

first circuitry residing within a radio frequency shielding structure of the radio, the radio frequency shielding structure having at least one aperture formed therein, said first circuitry including a microprocessor or digital signal processor having at least one buss coupled to an optical transmitter constructed and arranged to direct light toward said aperture; and control circuitry optically coupled to the first circuitry and residing outside of the radio frequency shielding structure shielding the first circuitry, the control circuitry being coupled to the means for transmitting and to the means for receiving and hence to the antenna switching means for control thereof and including a microprocessor or digital signal processor having at least one buss coupled to an optical detector constructed and arranged to receive light from the optical transmitter via the aperture.

2. A radio, comprising:

means for receiving radio frequency information;

means for transmitting information via a radio frequency signal;

an antenna;

antenna switching means for selectively coupling the antenna to the receiving means and the transmitting means;

first circuitry residing within a radio frequency shielding structure of the radio, the radio frequency shielding structure having at least one aperture formed therein, said aperture including an optically transparent or translucent and electrically conductive member covering the aperture said first circuitry including a microprocessor or digital signal processor having at least one buss coupled to an optical transmitter constructed and arranged to direct light toward said aperture; and control circuitry optically coupled to the first circuitry and residing outside of the radio frequency shielding structure shielding the first circuitry, the control circuitry being coupled to the means for transmitting and to the means for receiving and hence to the antenna switching means for control thereof and including a microprocessor or digital signal processor having at least one buss coupled to an optical detector constructed and arranged to receive light from the optical transmitter via the aperture.

* * * * *